United States Patent
Yokoyama

(10) Patent No.: US 11,548,196 B2
(45) Date of Patent: Jan. 10, 2023

(54) INJECTION APPARATUS

(71) Applicant: SODICK CO., LTD., Kanagawa (JP)

(72) Inventor: Koichi Yokoyama, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 50 days.

(21) Appl. No.: 17/035,753

(22) Filed: Sep. 29, 2020

(65) Prior Publication Data
US 2021/0129402 A1 May 6, 2021

(30) Foreign Application Priority Data

Oct. 30, 2019 (JP) .............................. JP2019-197190

(51) Int. Cl.
| | |
|---|---|
| *B29C 45/54* | (2006.01) |
| *B29C 45/00* | (2006.01) |
| *B29C 45/58* | (2006.01) |
| *B29C 45/60* | (2006.01) |
| *B29C 45/46* | (2006.01) |
| *B29C 45/53* | (2006.01) |

(Continued)

(52) U.S. Cl.
CPC .......... *B29C 45/54* (2013.01); *B29C 45/0001* (2013.01); *B29C 45/461* (2013.01); *B29C 45/531* (2013.01); *B29C 45/586* (2013.01); *B29C 45/60* (2013.01); *B29C 45/62* (2013.01); *B29C 45/77* (2013.01); *B29K 2019/00* (2013.01); *B29K 2101/12* (2013.01)

(58) Field of Classification Search
CPC ..... B29C 45/54; B29C 45/0001; B29C 45/77; B29C 45/586; B29C 45/531
See application file for complete search history.

(56) References Cited

U.S. PATENT DOCUMENTS 4,792,424 A * 12/1988 Loman ................... B29C 45/48
                                                264/102
6,468,464 B1 * 10/2002 Eckardt ................. B29C 45/581
                                                425/557

(Continued)

FOREIGN PATENT DOCUMENTS

| JP | S49-036153 | 3/1974 |
|---|---|---|
| JP | S60124232 | 7/1985 |

(Continued)

OTHER PUBLICATIONS

"Office Action of Japan Counterpart Application" with English translation thereof, dated Mar. 3, 2020, p. 1-10.

*Primary Examiner* — Nahida Sultana
*Assistant Examiner* — Debjani Roy
(74) *Attorney, Agent, or Firm* — JCIPRNET

(57) ABSTRACT

An injection apparatus of the invention injects a molding material supplied from a material supply port, and includes a die, a material supply apparatus that extrudes the molding material that is thread-like or strip-like via the die, and a material guide apparatus that guides the molding material supplied via the die to the material supply port. The material discharge port of the material supply apparatus and the die protrude downward in the material supply apparatus, and a pressure inside the material guide apparatus is reduced by a pressure reducing apparatus from a pressure reducing port provided above the material discharge port of the material supply apparatus and the die.

11 Claims, 15 Drawing Sheets

(51) Int. Cl.
  *B29C 45/77* (2006.01)
  *B29C 45/62* (2006.01)
  *B29K 19/00* (2006.01)
  *B29K 101/12* (2006.01)

(56) References Cited

U.S. PATENT DOCUMENTS

| | | | | |
|---|---|---|---|---|
| 7,993,128 | B2 * | 8/2011 | Marumoto | B29C 48/63 366/100 |
| 2002/0011682 | A1 * | 1/2002 | Shimizu | B29C 45/54 264/40.4 |
| 2005/0056978 | A1 * | 3/2005 | Fujikawa | B22D 17/28 266/200 |

FOREIGN PATENT DOCUMENTS

| | | |
|---|---|---|
| JP | S61500902 | 5/1986 |
| JP | H02102015 | 4/1990 |
| JP | H0351115 | 3/1991 |
| JP | H04339618 | 11/1992 |
| JP | 2015101001 | 6/2015 |
| JP | 2017226138 | 12/2017 |
| JP | 2019104125 | 6/2019 |

\* cited by examiner

INJECTION APPARATUS

CROSS-REFERENCE TO RELATED APPLICATION

This application claims the priority benefit of Japan application serial no. 2019-197190, filed on Oct. 30, 2019. The entirety of the above-mentioned patent application is hereby incorporated by reference herein and made a part of this specification.

BACKGROUND

Technical Field

The invention relates to an injection apparatus.

Description of Related Art

An apparatus which supplies a molding material into an injection chamber by using a rotating screw and injects the molding material in the injection chamber to a mold, etc., by using a forward-moving screw or plunger is known. For example, Patent Document 1 (Japanese Laid-open No. 4-339618.) discloses an injection apparatus that injects a molding material such as rubber. An apparatus body of a conventional injection apparatus has a screw in a cylinder. The molding material is supplied into the cylinder from a material supply port formed in the cylinder and then supplied to an injection chamber by using a rotating screw. Gas, such as air, mixed into the molding material is discharged from the material supply port or a vent hole formed in the cylinder.

However, when a lot of gas, such as air, is mixed into a molding material, even if the apparatus body of an injection apparatus is provided with a vent hole, there is still a case in which the gas, such as air, cannot be sufficiently removed from the molding material. In the case in which the molding material is rubber, for example, after being formed into a plate shape by using a press or a roller, the molding material is then formed into a lump or a ribbon through a human operation or a machine. In such a process, there is a case where a lot of gas, such as air, in the atmosphere is mixed into the lump or the ribbon of the molding material. In addition, there is also a case where the gas, such as air, is mixed deeply inside from the surface of the lump or the ribbon of the molding material. Moreover, there is also a case where the gas, such as air, is scattered as small bubbles in the lump or the ribbon of the molding material. A molded article molded from such molding material becomes a defective article in which a void or a defect is generated, and the yield is reduced.

The invention provides an injection apparatus capable of efficiently removing the gas, such as air, from the molding material even if the gas, such as air, is mixed into the molding material. Additional objects and advantages of the invention will be set forth in the description that follows.

SUMMARY

An injection apparatus of the invention injects a molding material supplied into an injection chamber of an apparatus body via a material supply port formed in the apparatus body. The injection apparatus includes a die, a material supply apparatus, and a material guide apparatus. The die is provided between the material supply apparatus and the material guide apparatus, and has at least one through hole that penetrates through from the material supply apparatus to the material guide apparatus. The material supply apparatus is configured to be able to supply the molding material that is thread-like or strip-like and has a cross section shape matching a shape of the through hole of the die to the material guide apparatus via the die by a pusher or a screw that extrudes the molding material. The material guide apparatus is a chamber, and is configured to be able to guide the molding material supplied via the die to the material supply port. A material discharge port of the material supply apparatus and the die are further provided to protrude downward in the chamber of the material guide apparatus. A pressure reducing port is provided above the die and the material discharge port where the die is disposed in the chamber, and a pressure inside the chamber is reduced from the pressure reducing port by a pressure reducing apparatus.

DESCRIPTION OF THE EMBODIMENTS

Embodiments of the invention will be described below with reference to the drawings. The various features shown in the embodiments described below can be combined with each other. In particular, in the specification, the term "part" may include, for example, a combination of hardware resources implemented by a circuit in a broad sense and information processing of software that can be specifically realized by the hardware resources. In addition, while various information (programs, contents, etc.) are handled in the embodiment, such information is represented as a bit group of binary values formed by 0 and 1 by the level of a signal value, and is transmitted/computed on a circuit in a broad sense.

The circuit in a broad sense is a circuit realized by at least properly combining a circuit, a circuitry, a processor, and a memory, etc. That is, such a circuit includes an application specific integrated circuit (ASIC), a programmable logic device (e.g., a simple programmable logic device (SPLD)), a complex programmable logic device (CPLD), and a field programmable gate array (FPGA), etc.

1. Embodiment 1

Figure 1:
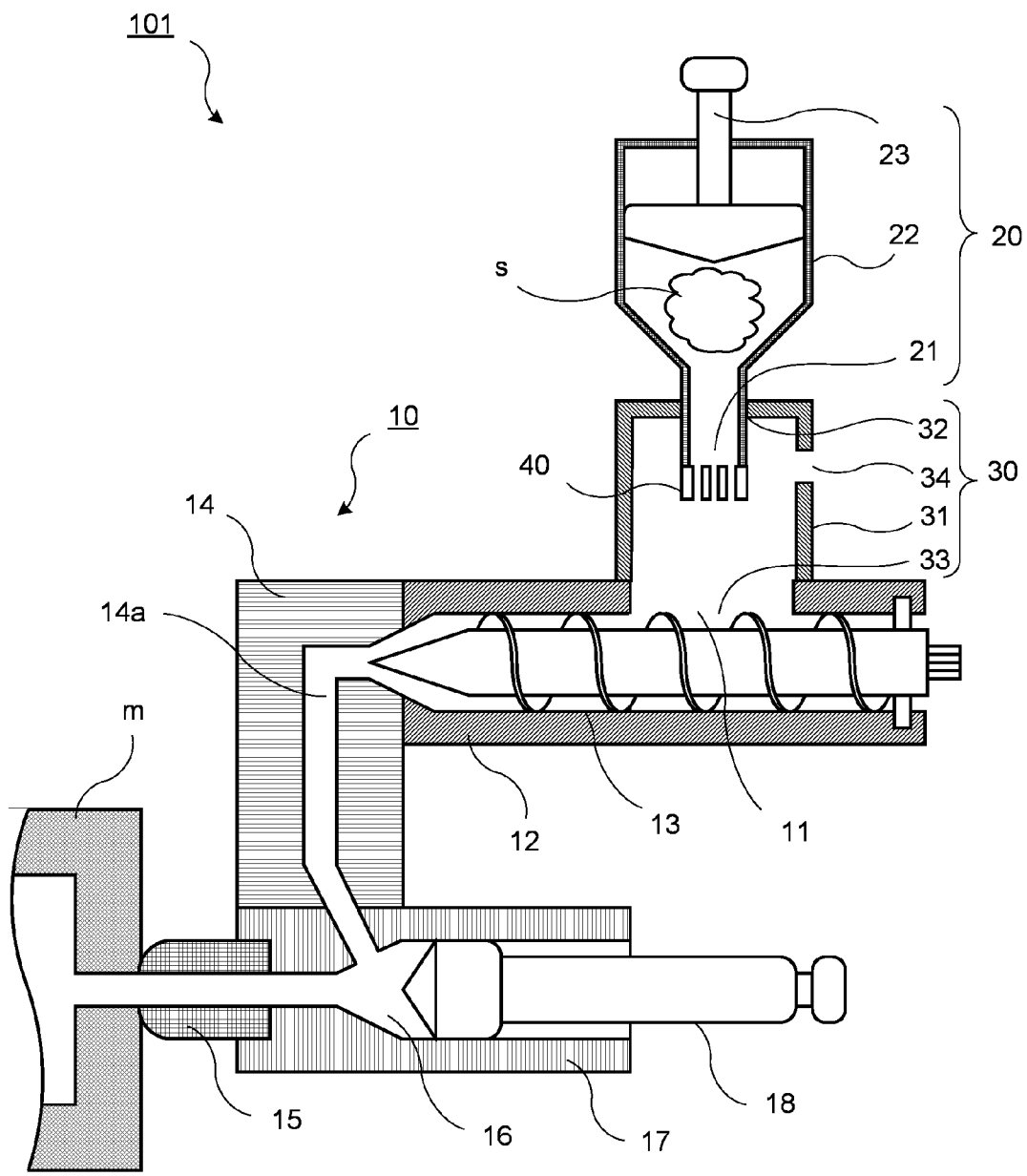
FIG. 1 is a view illustrating a configuration of an injection apparatus 101 according to an embodiment of the invention.

FIG. 1 is a view illustrating a configuration of an injection apparatus 101 according to an embodiment of the invention. As shown in FIG. 1, the injection apparatus 101 includes a material supply apparatus 20, a material guide apparatus 30, and a die 40, and injects a molding material supplied into an injection chamber 16 of an apparatus body 10 via a material supply port 11 formed in the apparatus body 10 to a mold m. The die 40 is provided between the material supply apparatus 20 and the material guide apparatus 30, and has at least one through hole that penetrates through from the material supply apparatus 20 to the material guide apparatus 30. The material supply apparatus 20 is configured to be able to supply the molding material to the material guide apparatus 30 via the die 40. The material guide apparatus 30 is configured to be able to guide the molding material supplied via the die 40 to the material supply port 11.

In addition, if it is necessary to heat the molding material, the injection apparatus 101 including the apparatus body 10, the material supply apparatus 20, the material guide apparatus 30, and the die 40 may be provided with a heating apparatus, such as a heater or a pipe that a heating medium flows through, at a necessary place. In addition, if it is necessary to cool off the molding material, the injection apparatus 101 including the apparatus body 10, the material supply apparatus 20, the material guide apparatus 30, and the die 40 may be provided with a cooling apparatus, such as a pipe that a cooling medium flows through, at a necessary place.

In detail, the apparatus body 10 includes the material supply port 11, a supply cylinder 12, a supply screw 13, a junction 14, a communication passage 14a, a nozzle 15, the injection chamber 16, an injection cylinder 17, and an injection plunger 18. For the ease of description, the junction 14, the nozzle 15, and the injection cylinder 17 are shown in cross section. The supply cylinder 12 and the injection cylinder 17 are connected by the junction 14. The inside of the supply cylinder 12 and the inside of the injection cylinder 17 are in communication via the communication passage 14a formed in the junction 14.

The supply cylinder 12 is formed with the material supply port 11 and accommodates the supply screw 13 to be rotatable. The supply screw 13 rotates to supply the molding material guided from the material supply port 11 into the injection cylinder 17 via the communication passage 14a. The supply screw 13 is rotated by a supply screw driving apparatus 131 (not shown in FIG. 1) that will be described afterwards. The rotating supply screw 13 delivers the molding material in a direction from the base of the supply screw 13 toward the tip. If the rotation speed of the supply screw 13 is increased, the speed of delivering the molding material guided from the material supply port 11 into the injection chamber 16 can be increased.

In the injection cylinder 17, the injection chamber 16 accommodating the molding material that is supplied from the supply cylinder 12 via the communication passage 14a is formed, and the injection cylinder 17 accommodates the injection plunger 18 to be movable back and forth. The injection chamber 16 is formed in front of the injection plunger 18, and the volume of the injection chamber 16 is increased/decreased by moving the injection plunger 18 back and forth.

The injection plunger 18 moves backward to measure the molding material in the injection chamber 16, and moves forward to inject the molding material in the injection chamber 16 into the mold m via the nozzle 15. "Moving forward" refers to the movement of the injection plunger 18 toward the direction of the mold m, and "moving backward" refers to the movement in the opposite direction. In addition, the injection plunger 18 is moved by an injection plunger driving apparatus 181 (not shown in FIG. 1) that will be described afterwards.

The communication passage 14a is opened at the time of measurement by a backflow prevention apparatus (not shown in FIG. 1), and is closed at the time of injection.

The backflow prevention apparatus, for example, moves the supply screw 13 forward to close the opening of the communication path 14a on the side of the supply cylinder 12 by using the tip of the supply screw 13, and moves the supply screw 13 backward to separate the tip of the supply screw 13 from the opening of the communication path 14a on the side of the cylinder 12, so as to open the opening on the side of the supply cylinder 12. In addition, the backflow prevention apparatus may also be a valve mechanism, such as a rotary valve or a check valve, provided in the middle of the communication passage 14a. Regarding the junction 14 and the nozzle 15, details in this regard will be omitted.

The material supply apparatus 20 includes a material discharge port 21, a cylinder 22, and a pusher 23. For the ease of description, the cylinder 22 is shown in a cross-section.

The material discharge port 21 is a discharge port of rubber or silicon rubber s, which is the molding material, accommodated in the cylinder 22, and the die 40 is attached to the material discharging port 21. The die 40 is removable.

The cylinder 22 accommodates the rubber or the silicon rubber s, which is the molding material, and accommodates the pusher 23 to be movable back and forth. The rubber or the silicon rubber s is supplied from the outside into the cylinder 22. For example, a material supply port (not shown in FIG. 1) may be formed at a predetermined position in the cylinder 22. In addition, for example, in the cylinder 22, the material discharge port 21 is formed at an end part of the cylinder 22, and a removable cover member (not shown in FIG. 1) is attached to the other end part of the cylinder 22. The cover member allows the pusher 23 to penetrate through to be movable back and forth, and the rubber or the silicon rubber s, which is the molding material, may be supplied into the cylinder 22 by removing the cover member together with the pusher 23.

The pusher 23 moves forward to extrude the rubber or the silicon rubber s, which is the molding material, in the cylinder 22 to the material guide apparatus 30 via the die 40. If the moving speed of the pusher 23 is increased, the speed of delivering the molding material in the cylinder 22 into the material guide apparatus 30 can be increased. "Moving forward" refers to the movement of the pusher 23 toward the material discharge port 21 (the die 40), and "moving backward" refers to the movement in the opposite direction. In addition, the pusher 23 is moved by a pusher driving apparatus 231 (not shown in FIG. 1) that will be described afterwards.

The material guide apparatus 30 is provided with a material inlet 32 and a material outlet 33. The rubber or the silicon rubber s, which is the molding material, that is extruded from the die 40 enters the inside of the material guide apparatus 30 from the material inlet 32, passes through the inside of the material guide apparatus 30, and is guided to the material supply port 11 of the apparatus body 10 from the material outlet 33. The material guide apparatus 30 may be a chamber 31, for example.

The material inlet 32 of the chamber 31 is connected with the material discharge port 21 of the material supply apparatus 20. The material inlet 32 of the chamber 31 may also be connected with the die 40 attached to the material discharge port 21 of the material supply apparatus 20. The material discharge port 21 and the die 40 may also protrude from the material inlet 32 into the inside of the material guide apparatus 30. While the material inlet 32 can be provided at any place in the chamber 31, the material inlet 32 may be provided on the top surface or the upper side surface of the chamber 31. FIG. 1, for example, illustrates the case where the material inlet 32 is provided on the top surface of the chamber 31. In addition, FIG. 1, for example, illustrates the case where the material discharge port 21 and the die 40 are provided to protrude downward in the chamber 31.

The material outlet 33 of the chamber 31 is connected with the material supply port 11 of the apparatus body 10. While the material outlet 33 can be provided at any place in the chamber 31, the material outlet 33 may be provided on the bottom surface or the lower side surface of the chamber 31.

In addition, a pressure reducing port 34 may be provided in the chamber 31. The injection apparatus 101 may include a pressure reducing apparatus 35 (not shown in FIG. 1). For example, the pressure reducing apparatus 35 is connected to the pressure reducing port 34, and the pressure inside the chamber 31 is reduced by the pressure reducing apparatus 35. While the pressure reducing port 34 can be provided at any place in the chamber 31, the pressure reducing port may be provided on the top surface or the upper side surface of the chamber 31. That is, the pressure reducing port 34 may be provided above the die 40 or the pressure discharge port 21 to which the die 40 is attached. Such arrangement is made so that it is difficult for the rubber or silicon rubber s, which is the molding material, that passes through the inside of the chamber 31 to be sucked from the pressure reducing port 34 when the pressure reducing apparatus 35 reduces the pressure inside the chamber 31. Also, such arrangement is made so that it is difficult for the rubber or silicon rubber s, which is the molding material, that remains in the chamber 31 to be sucked from the pressure reducing port 34 when the pressure reducing apparatus 35 reduces the pressure inside the chamber 31.

In particular, in the case where the material discharge port 21 and the die 40 are provided to protrude downward in the chamber 31 and the pressure reducing port 34 is provided above the material discharge port 21 and the die 40, even in a state of hanging along the direction of the material outlet 33 under the condition of being connected like a thin thread or a thin strip so as to be broken, torn, tattered to discharge the gas easily, the influence of the airflow generated from the pressure reducing port 34 is suppressed and it becomes difficult to suck the rubber or the silicon rubber s from the pressure reducing port 34, and it becomes difficult for the rubber or the silicon rubber s to be torn off to be sucked from the pressure reducing port 34 under the influence of the airflow.

The die 40 may be provided between the rubber or the silicon rubber s, which is the molding material, being discharged from the material supply apparatus 20 and entering the material guide apparatus 30. The die 40, for example, may be provided at the material discharge port 21 of the material supply apparatus 20. The die 40 may be configured to be removable from the material discharge port 21.

Figure 2:
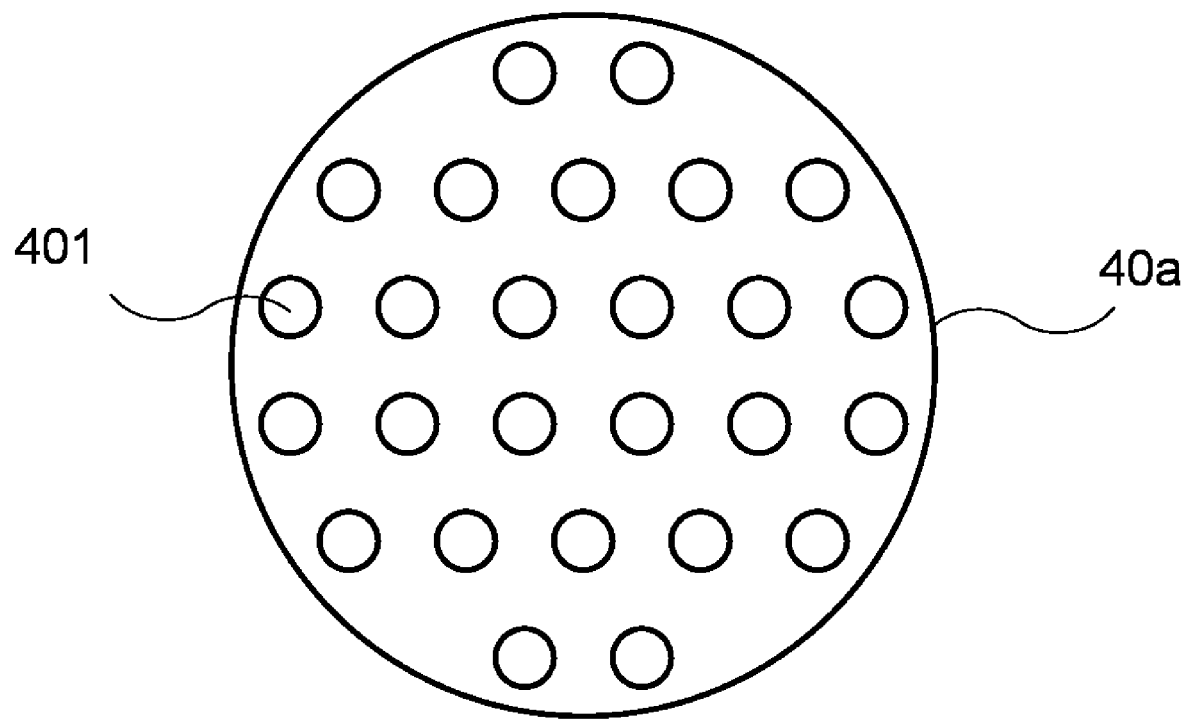
FIG. 2 is a view illustrating a top surface of a die 40.
Figure 3:
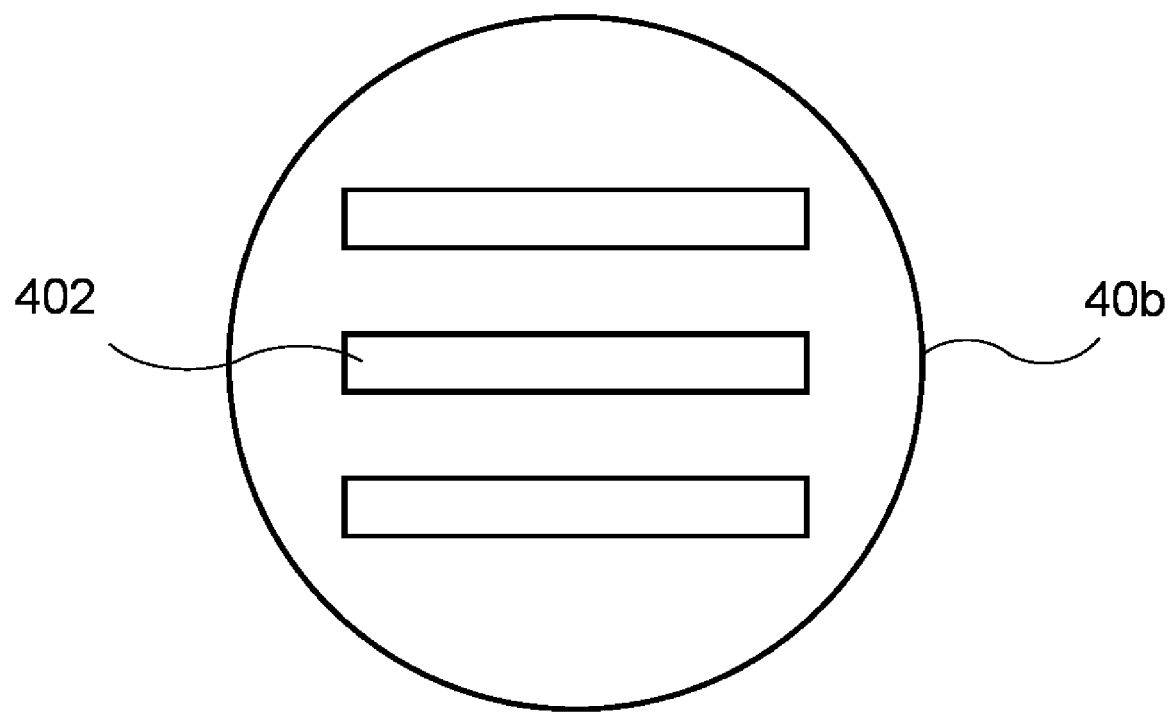
FIG. 3 is a view illustrating a top surface of the die 40.
Figure 4:
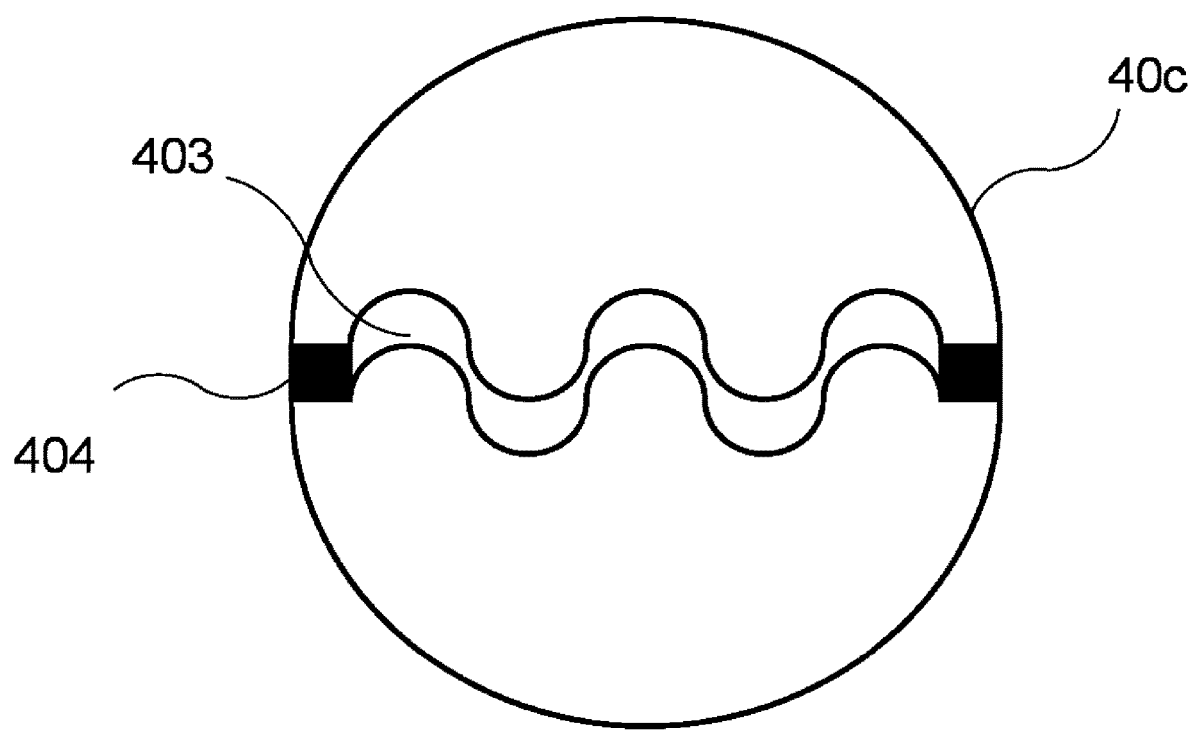
FIG. 4 is a view illustrating a top surface of the die 40.

Here, several examples of the die 40 are described in detail. FIGS. 2 to 4 are views illustrating the top surface of the die 40. The top surface of the die 40 is the surface connected with the material discharge port 21.

As shown in FIG. 2, a die 40a has a plurality of through holes 401 whose end part cross sections are circular. In the case of using the die 40a, the rubber or the silicon rubber s is discharged from the material discharge port 21 in a thread shape whose cross sectional shape matches the shape of the through hole 401 of the die 40a. In the case where gas, such as air, is mixed into the rubber or the silicon rubber s, the gas, such as air, in the rubber or the silicon rubber s is inflated in the chamber 31 whose pressure is reduced to break, tear, tatter a portion of the rubber or the silicon rubber s, and the gas, such as air, in the rubber or the silicon rubber s is discharged.

As shown in FIG. 3, a die 40b has a plurality of through holes 402 whose end part cross sections are rectangular. In the case of using the die 40b, the rubber or the silicon rubber s is discharged from the material discharge port 21 in a strip shape whose cross sectional shape matches the shape of the through hole 402 of the die 40b. In the case where gas, such as air, is mixed into the rubber or the silicon rubber s, the gas, such as air, in the rubber or the silicon rubber s is inflated in the chamber 31 whose pressure is reduced to break, tear, tatter a portion of the rubber or the silicon rubber s, and the gas, such as air, in the rubber or the silicon rubber s is discharged.

Since the die 40 is removable, the die 40 can be properly selected in response to the properties of the rubber or the silicon rubber s, the interval of injection from the injection chamber 16, etc.

As shown in FIG. 4, a die 40c has a through hole 403 whose end part cross section is in a continuous S shape. In the case of using the die 40c, the rubber or the silicon rubber s is discharged from the material discharge port 21 in a strip shape whose cross sectional shape matches the shape of the through hole 403. The die 40c is configured to be provided with an adjustment mechanism 404, and the size of the through hole 403 can be adjusted. Since the adjustment mechanism 404 can change the width of the through hole 403 by a screw, for example, the width of the though hole 403 can be adjusted in the state in which the die 40c is installed to the material discharge port 21.

Figure 5:
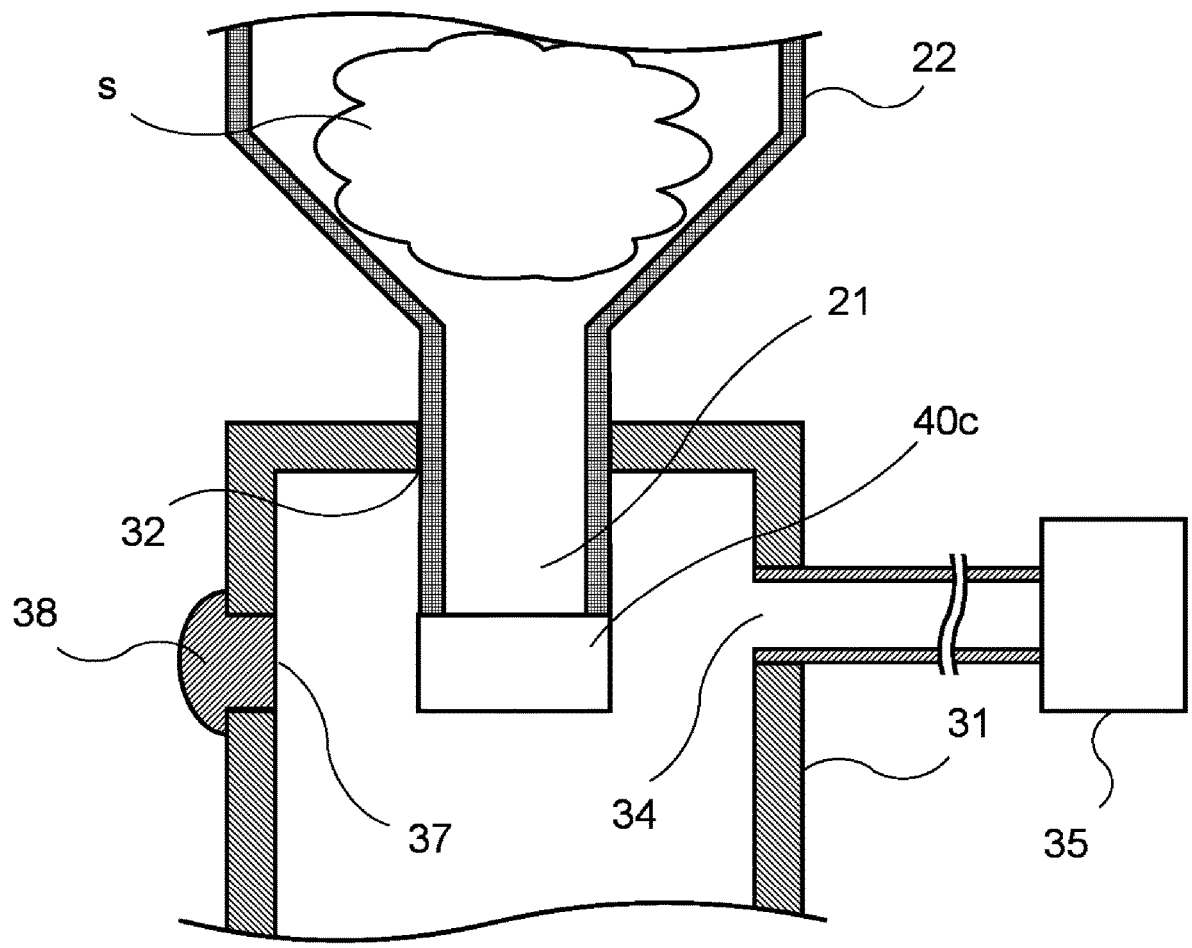
FIG. 5 is a view illustrating a case in which a chamber 31 is adapted for the adjustment of the width of a through hole 403.
Figure 6:
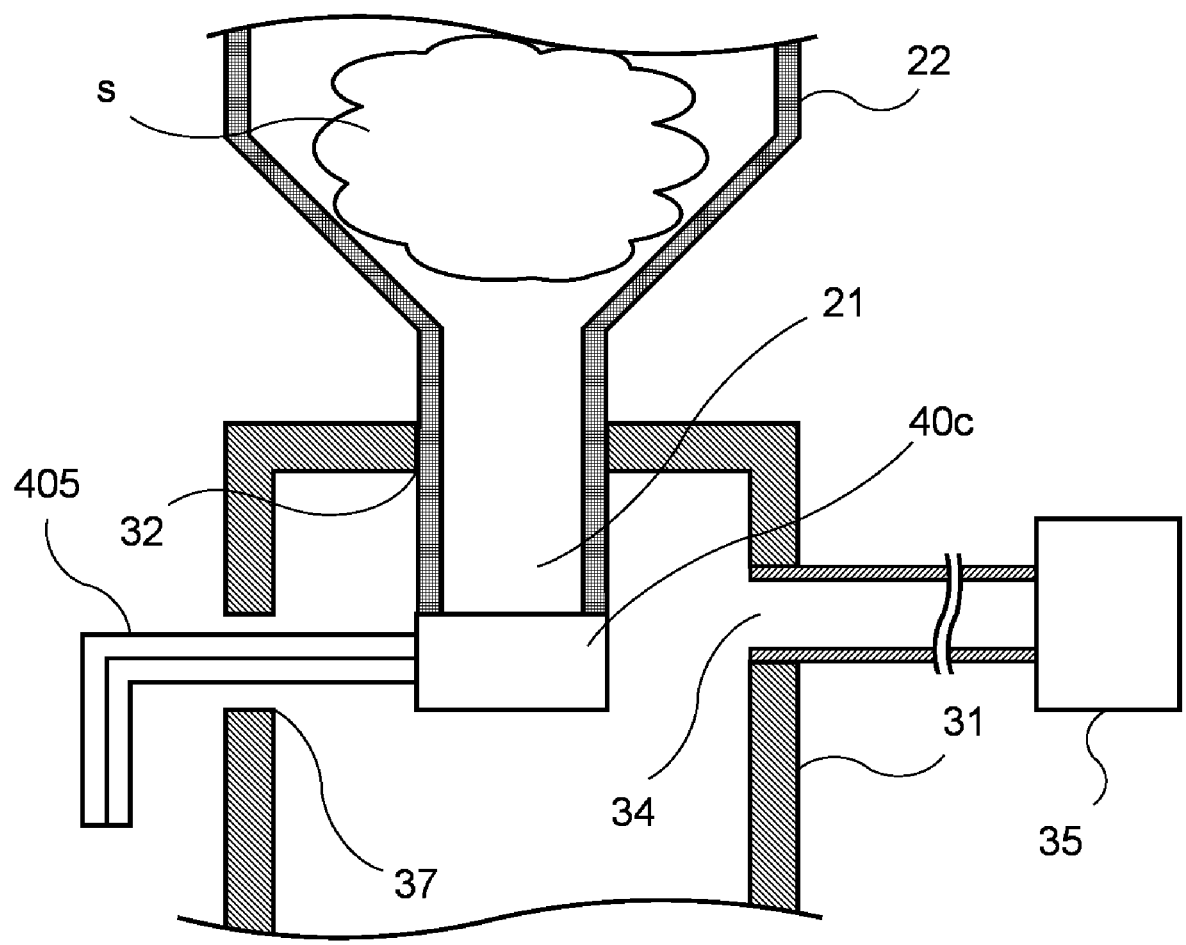
FIG. 6 is a view illustrating a case in which the chamber 31 is adapted to the adjustment of the width of the through hole 403.

Here, an example of the case in which the chamber 31 is adapted to the adjustment to the width of the through hole 403 is described. FIGS. 5 and 6 are views illustrating a case in which the chamber 31 is adapted to the adjustment of the width of the through hole 403. FIGS. 5 and 6 illustrate the pressure reducing apparatus 35 connected to the pressure reducing port 34 of the chamber 31.

As shown in FIGS. 5 and 6, an adjustment port 37 is provided in the chamber 31. As shown in FIG. 5, a cap 38 is installed to the adjustment port 37 at the time of reducing the pressure inside the chamber 31. Meanwhile, as shown in FIG. 6, at the time of adjusting the width of the through hole 403, after making the pressure inside the chamber 31 the normal pressure, the cap 38 is removed, and an adjustment tool 405 is inserted into the chamber 31 from the adjustment port 37 to adjust the width of the through hole 403.

Here, while the top surface of the die 40 is described as having a circular shape or a substantially circular shape, the invention is not limited thereto. For example, a die in which the shape of the top surface is square or elliptical can also be used. Of course, in this case, the shape of the material discharge port 21 also matches the shape of the die 40.

In addition, while the dies 40 in which the through holes 401 whose end part cross sections are circular, the through holes 402 whose end part cross sections are rectangular, and the through hole 403 whose end part cross section is a continuous S shape are described, the shape of the end part cross section of the through hole formed on the die 40 is not limited thereto. Various shapes may be adopted as long as the gas, such as air, in the rubber or the silicon rubber s is inflated in the chamber 31 whose pressure is reduced to break, tear, tatter a portion of the rubber or the silicon rubber s, and the gas, such as air, in the rubber or the silicon rubber s is discharged.

In addition, while the adjustment mechanism 404 that changes the width of the through hole 403 by a screw is described, the adjustment mechanism 404 is not limited thereto. Various mechanisms may be adopted as long as the width of the through hole 403 can be changed. In addition, the adjustment mechanism 404 may also be solely a spacer. The width of the through hole may be set by the thickness of the spacer sandwiched between two divided bodies forming the die 40. A plurality of spacers having different thicknesses may be prepared and selectively attached to the die 40 to form a necessary width of the through hole.

In addition, while the adjustment mechanism 404 that changes the size of the width of the through hole 403 whose end part cross section is in a continuous S shape is described herein, the invention is not limited thereto. Various mechanisms capable of changing sizes may be adopted, so as to change the predetermined sizes of various shapes of the end part cross sections of the through holes, such as the size of the inner diameter of the through hole 401 whose end part cross section is circular and the size of the width of the through hole 402 whose end part cross section is rectangular.

Figure 7:
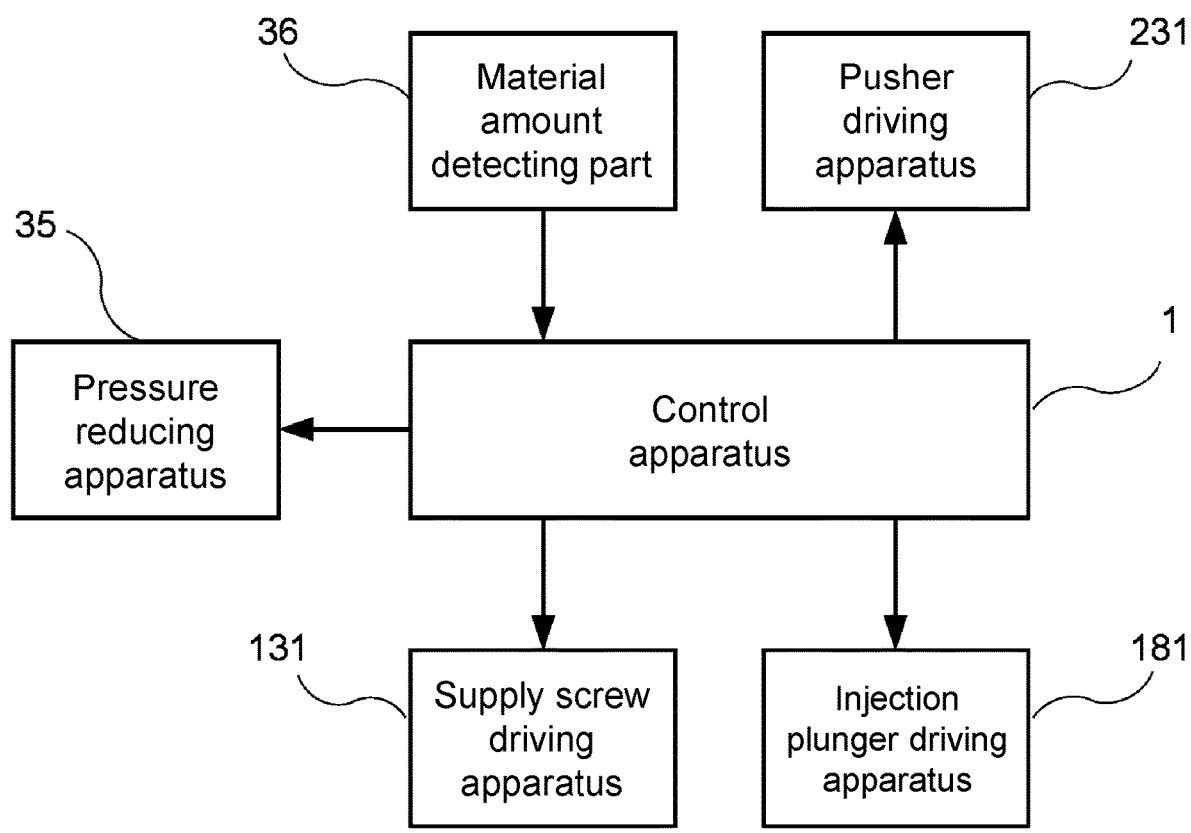
FIG. 7 is a block diagram illustrating a relation between a control apparatus 1 and other configuration parts connected to the control apparatus 1.

The injection apparatus 101 includes a control apparatus 1 not shown in FIG. 1. Here, the control apparatus 101 is described. FIG. 7 is a block diagram illustrating a relation between the control apparatus 1 and other configuration parts connected to the control apparatus 1.

As shown in FIG. 7, the control apparatus 1 is electrically connected to the respective parts of the pusher driving apparatus 231, a material amount detecting part 36, the pressure reducing apparatus 35, the supply screw driving apparatus 131, and the injection plunger driving apparatus 181. The control apparatus 1 can, for example, control the supply screw driving apparatus 131 to control the speed of supplying the molding material into the injection chamber 16. Therefore, the apparatus body 10 is configured to be able to adjust the speed of supplying the molding material into the injection chamber 16 by the supply screw driving apparatus 131 that rotates the supply screw 13. Although the details will be described later, the material amount detecting part 36 is not always required. In addition, the pressure reducing apparatus 35, the supply screw driving apparatus 131, and the injection plunger driving apparatus 181 may all be controlled by one or more control means different from the control apparatus 1. In addition, if the pressure reducing apparatus 35 can constantly maintain the pressure inside the chamber 31 to be equal to or lower than a predetermined pressure, the pressure reducing apparatus 35 may be controlled independently.

The pusher driving apparatus 231 moves the pusher 23 to extrude the rubber or the silicon rubber s from the material discharge port 21. The pressure reducing apparatus 35 reduces the pressure inside the chamber 31. The pressure reducing apparatus 35 is, for example, a vacuum pump. The supply screw driving apparatus 131 rotates the supply screw 13 and supplies the molding material to the injection cylinder 17. The injection plunger driving apparatus 181 moves the injection plunger 18 and injects the molding material in the injection chamber 16.

The control apparatus 1 controls the pusher driving apparatus 231 to control the speed of supplying the molding material to the material guide apparatus 30. Therefore, the material supply apparatus 20 is configured to be able to adjust the speed of supplying the molding material to the material guide apparatus 30 by the pusher driving apparatus 231 that drives the pusher 23.

The control apparatus 1, for example, may control at least one of the apparatus body 10 and the material supply apparatus 20, so that the speed at which the material supply apparatus 20 supplies the molding material to the material guide apparatus 30 is slower than the speed at which the apparatus body 10 supplies the molding material into the injection chamber 16. The control apparatus 1, for example, may control the material supply apparatus 20 so that the speed at which the material supply apparatus 20 supplies the molding material to the material guide apparatus 30 is slower with respect to the speed at which the apparatus body 10 supplies the molding material into the injection chamber 16.

The control apparatus 1 can, for example, control the moving speed of the pusher 23 via the pusher driving apparatus 231, so that the speed at which the material supply apparatus 20 supplies the molding material to the material guide apparatus 30 is slower with respect to the speed at which the apparatus body 10 supplies the molding material into the injection chamber 16. The control apparatus 1 can, for example, control the rotation speed of the supply screw 13 via the supply screw driving apparatus 131, so that the speed at which the apparatus body 10 supplies the molding material into the injection chamber 16 is faster with respect to the speed at which the material supply apparatus 20 supplies the molding material to the material guide apparatus 30.

In addition, the control apparatus 1 may, for example, exert control, so as to adjust at least one of the speed at which the apparatus body 10 supplies the molding material into the injection chamber 16 and the speed at which the material supply apparatus 20 supplies the molding material to the material guide apparatus 30 in response to the amount of the molding material remaining in the material guide apparatus 30. The control apparatus 1 may, for example, exert control, so as to adjust the speed at which the material supply apparatus 20 supplies the molding material to the material guide apparatus 30 in response to the amount of the molding material remaining in the material guide apparatus 30.

The control apparatus 1 can, for example, control the moving speed of the pusher 23 via the pusher driving apparatus 231, so as to adjust the speed at which the material supply apparatus 20 supplies the molding material to the material guide apparatus 30 in response to the amount of the molding material remaining in the material guide apparatus 30. The control apparatus 1 can, for example, control the rotation speed of the supply screw 13 via the supply screw driving apparatus 131, so as to adjust the speed at which the apparatus body 10 supplies the molding material into the injection chamber 16 in response to the amount of the molding material remaining in the material guide apparatus 30. In this case, the control apparatus 1 needs to be connected with the material amount detecting part 36. The material amount detecting part 36 detects the amount of the molding material remaining in the chamber 31 of the material guide apparatus 30, and a light sensor, etc., may be adopted as the material amount detecting part 36.

Figure 8:
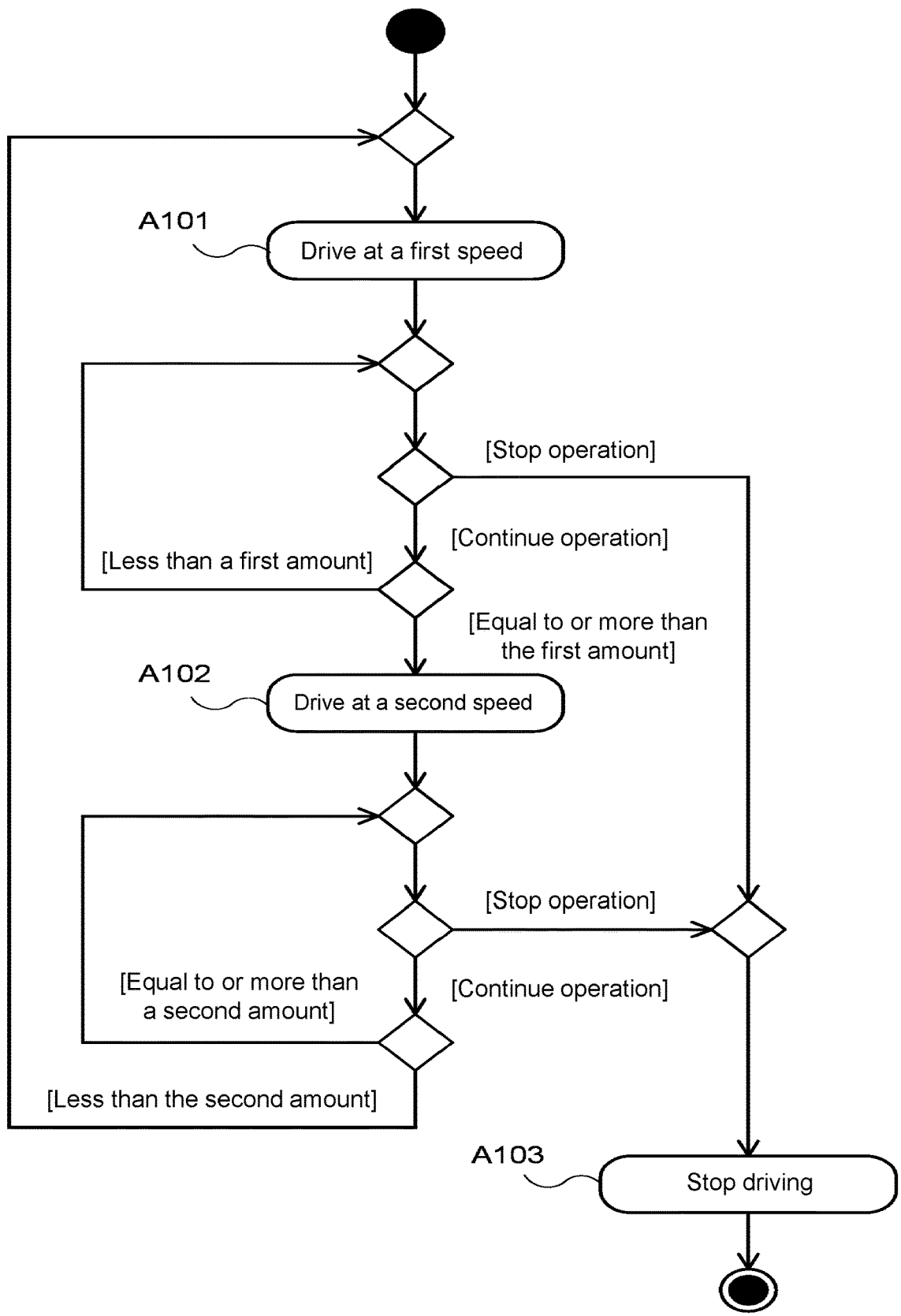
FIG. 8 is an activity diagram illustrating an operation flow of the control device 1.

Here, the operation for the case where the control apparatus 1 controls the speed of supplying the molding material in response to the amount of the molding material remaining in the material guide apparatus 30 is described. FIG. 8 is an activity diagram illustrating an operation flow of the control device 1.

When the operation starts, the control apparatus 1 firstly controls the pusher driving apparatus 231 to move the pusher 23 at the first speed (A101). Then, as the injection apparatus 101 continues operating, if the material amount detecting part 36 detects that the amount of the molding material remaining in the chamber 31 is less than the first amount, the pusher 23 is still moved at the first speed.

Then, when the material amount detecting part 36 detects that the amount of the molding material remaining in the chamber 31 is equal to or more than the first amount, the control apparatus 1 controls the pusher driving apparatus 231 to move the pusher 23 at the second speed (A102). The second speed is slower than the first speed, and the speed may be 0. That is, the pusher 23 may be stopped. Then, as the injection apparatus 101 continues operating, if the material amount detecting part 36 detects that the amount of the molding material remaining in the chamber 31 is equal to or more than the second amount, the pusher 23 is still moved at the second speed. The second amount is less than the first amount.

Then, when the material amount detecting part 36 detects that the amount of the molding material remaining in the chamber 31 is less than the second amount, the control apparatus 1 controls the pusher driving apparatus 231 to move the pusher 23 at the first speed (A101).

Then, when the operation of the injection apparatus 101 is stopped, the control apparatus 1 controls the pusher driving apparatus 231 to stop the movement of the pusher 23.

The moving speed of the pusher 23 can be manually adjusted by the operator. In such case, a window using a light transmissive material, such as glass, may be disposed on the chamber 31. The operator can visually check the amount of the molding material in the chamber 31 via the window disposed on the chamber 31. In addition, the material amount detecting part 36 can detect the amount of the molding material remaining in the chamber 31 via the window.

The apparatus body 10 has the supply cylinder 12 and the injection cylinder 17, and is an injection apparatus generally referred to as a pre-plastic injection apparatus. In addition, an apparatus body 60 described in the following may also be a pre-plastic injection apparatus having a plasticizing cylinder 62 and an injection cylinder 67. The pre-plastic method has higher measurement precision than the inline method described afterwards, and has small variation in the filling amount of the molding material injected into the mold m in each molding cycle. If the apparatus body of the invention adopts the pre-plastic method, the molding material after the unnecessary gas, such as air, is removed is measured at high precision and injected into the mold m, and, for example, the weight variation of the molded article molded in each cycle is suppressed, the yield, as well as the quality, are also facilitated.

2. Embodiment 2

Figure 9:
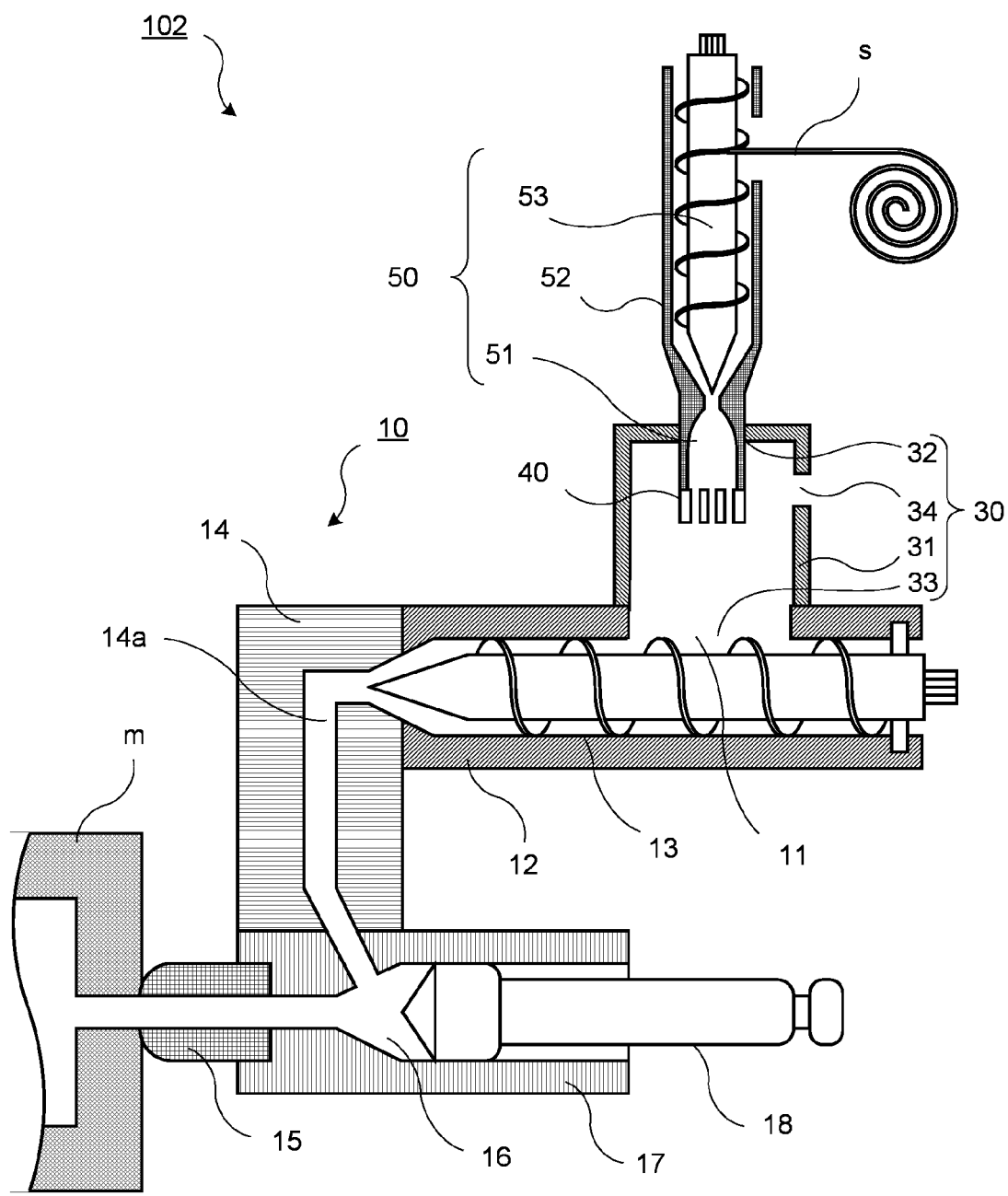
FIG. 9 is a view illustrating a configuration of an injection apparatus 102 according to an embodiment of the invention.

FIG. 9 is a view illustrating a configuration of an injection apparatus 102 according to an embodiment of the invention. As shown in FIG. 9, the injection apparatus 102 includes a material supply apparatus 50, the material guide apparatus 30, and the die 40, and injects the molding material supplied to the injection chamber 16 of the apparatus body 10 via the material supply port 11 formed in the apparatus body 10 to the mold m. Since the configurations of the apparatus body 10, the material supply apparatus 30, and the die 40 are the same as the case of Embodiment 1 (see FIG. 1), only the material supply apparatus 50 will be described herein.

As shown in FIG. 9, the material supply apparatus 50 includes a material outlet 51, a cylinder 51, a cylinder 52, and a screw 53. For the ease of description, the cylinder 52 is shown in a cross-section.

The material discharge port 51 is a discharge port of the rubber or the silicon rubber s extruded from the cylinder 52 by the screw 53, and is attached to the die 40. The die 40 is removable. For example, if the material guide apparatus 30 is the chamber 31, the material discharge port 51 or the die 40 may be connected with the material inlet 32 of the chamber 31. As another example, if the material guide apparatus 30 is the chamber 31, the material discharge port 51 and the die 40 may protrude toward the inside of the chamber 31 from the material inlet 32.

The cylinder 52 accommodates the rubber or the silicon rubber s, which is the molding material, and accommodates the screw 53 to be rotatable. FIG. 9 illustrates the case where the cylinder 52 and the screw 53 are disposed so that the axial direction of the screw 53 is oriented in the top-bottom direction, for example.

The screw 53 rotates to extrude the rubber or the silicon rubber s, which is the molding material, in the cylinder 52 to the material guide apparatus 30 via the die 40. If the rotation speed of the screw 53 is increased, the speed of delivering the molding material in the cylinder 52 into the material guide apparatus 30 can be increased. The rubber or the silicon rubber s is formed to be ribbon-like.

The screw 53 is rotated by a screw driving apparatus not shown herein. The screw driving apparatus, like the pusher driving apparatus 231, is controlled by the control apparatus 1. Therefore, the material supply apparatus 50 is configured to be able to adjust the speed of supplying the molding material to the material guide apparatus 30 by the screw driving apparatus that rotates the screw 53.

The control apparatus 1 can, for example, control the rotation speed of the screw 53 via the screw driving apparatus, so that the speed at which the material supply apparatus 50 supplies the molding material to the material guide apparatus 30 is slower with respect to the speed at which the apparatus body 10 supplies the molding material into the injection chamber 16. In addition, the control apparatus 1 can, for example, control the rotation speed of the screw 53 via the screw driving apparatus, so as to adjust the speed at which the material supply apparatus 50 supplies the molding material to the material guide apparatus 30 in response to the amount of the molding material remaining in the material guide apparatus 30.

3. Embodiment 3

Figure 10:
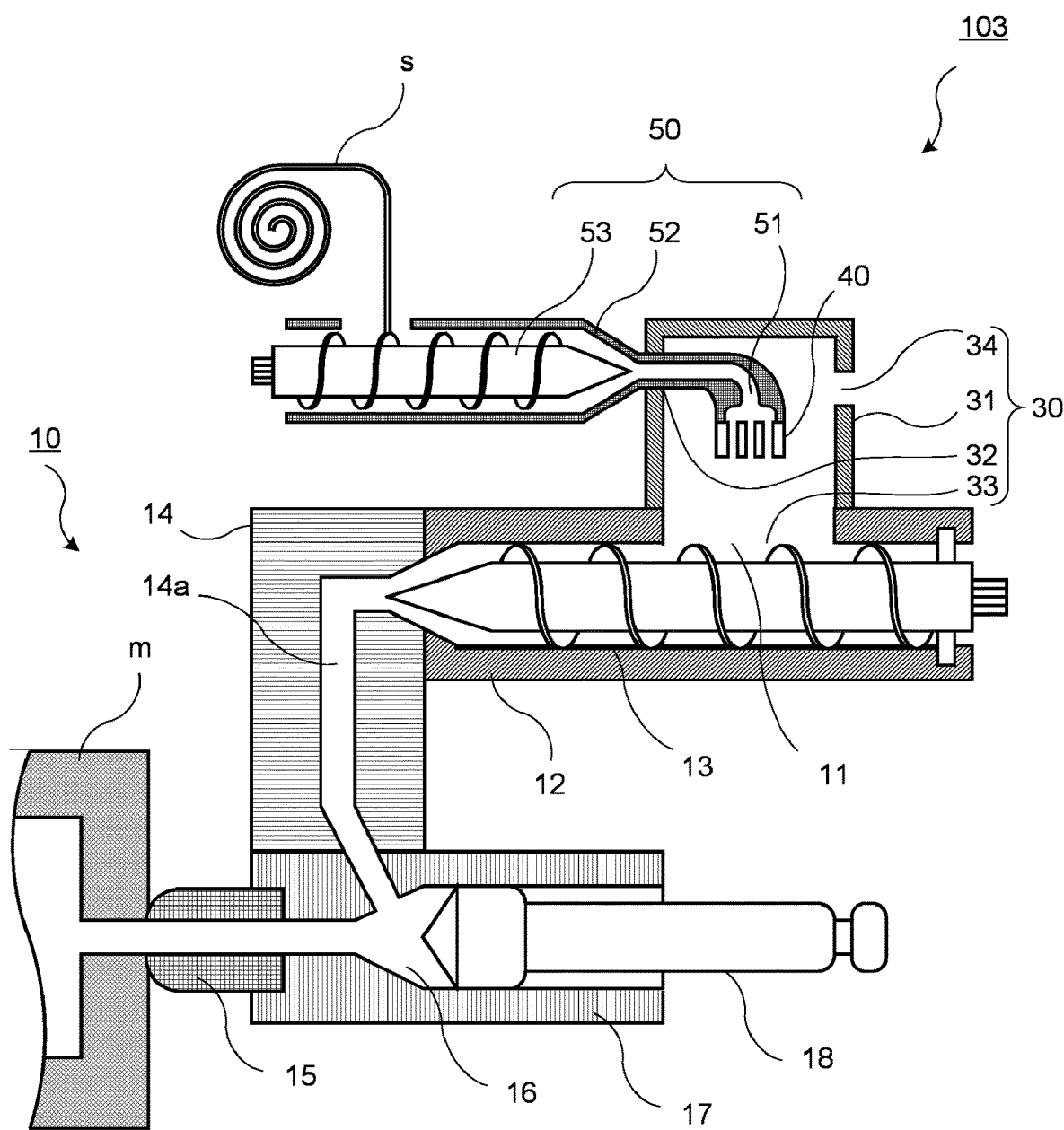
FIG. 10 is a view illustrating a configuration of an injection apparatus 103 according to an embodiment of the invention.

FIG. 10 is a view illustrating a configuration of an injection apparatus 103 according to an embodiment of the invention. As shown in FIG. 10, the injection apparatus 103 includes the material supply apparatus 50, the material guide apparatus 30, and the die 40, and injects the molding material supplied to the injection chamber 16 of the apparatus body 10 via the material supply port 11 formed in the apparatus body 10 to the mold m.

The injection apparatus 103 differs from the injection apparatus 102 of Embodiment 2 (see FIG. 9) only in the arrangement of the material supply apparatus 50 and the arrangement of the material inlet 32 of the material guide apparatus 30. Therefore, detailed descriptions will be omitted. FIG. 10, for example, illustrates the case where the material inlet 32 is provided on the upper side surface of the chamber 31. In addition, FIG. 10, for example, illustrates the case where the material discharge port 51 and the die 40 are provided to protrude downward in the chamber 31. FIG. 10 illustrates the case where the cylinder 52 and the screw 53 are disposed so that the axial direction of the screw 53 is oriented in the left-right direction, for example.

4. Embodiment 4

Figure 11:
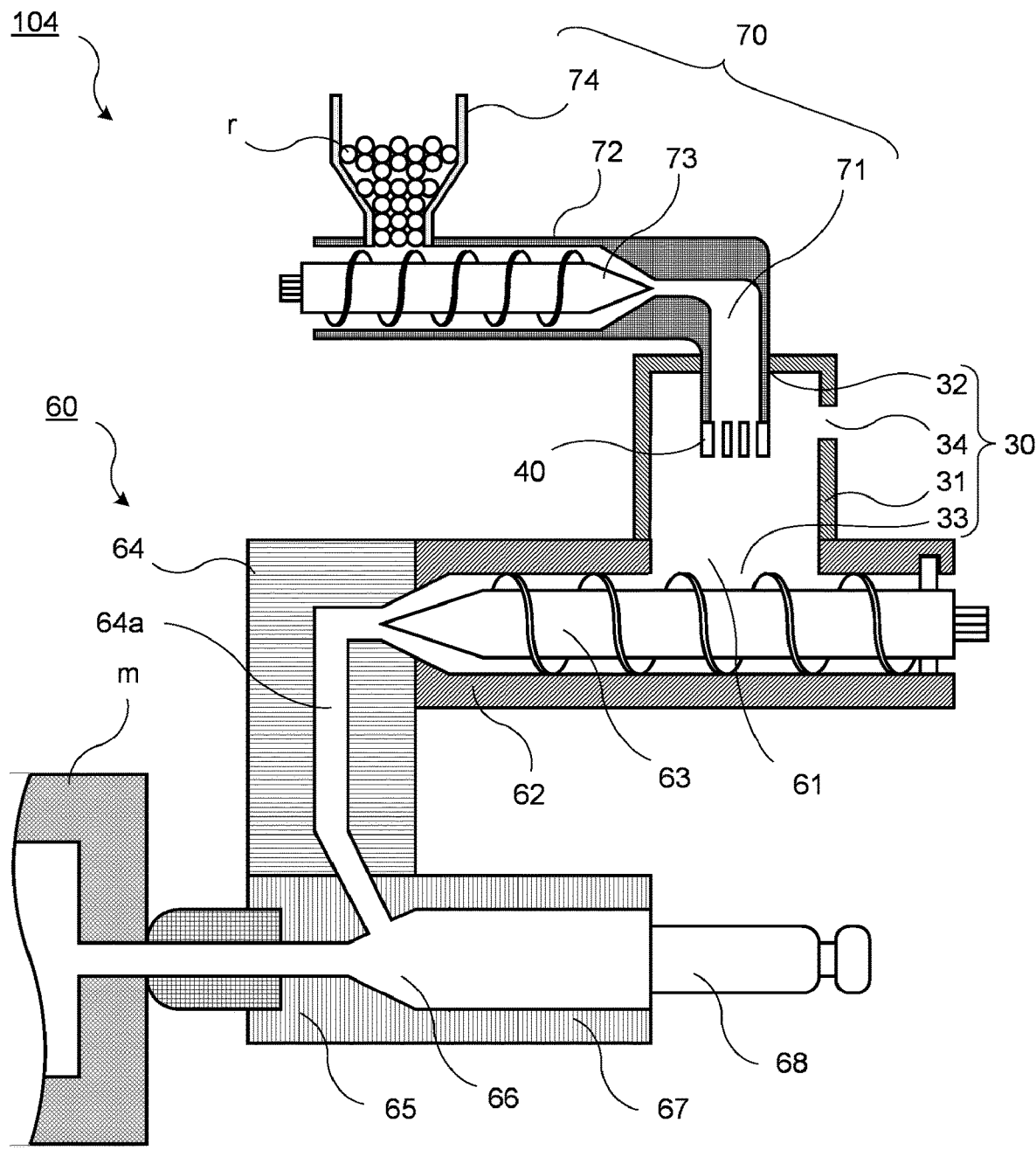
FIG. 11 is a view illustrating a configuration of an injection apparatus 104 according to an embodiment of the invention.

FIG. 11 is a view illustrating a configuration of an injection apparatus 104 according to an embodiment of the invention. As shown in FIG. 11, the injection apparatus 104 includes the material supply apparatus 70, the material guide apparatus 30, and the die 40, and injects the molding material supplied to the injection chamber 66 of the apparatus body 60 via the material supply port 61 formed in the apparatus body 60 to the mold m.

The material supply apparatus 70 is configured to be able to supply a molding material to the material guide apparatus 30 via the die 40. If the material guide apparatus 30 is the chamber 31, the material supply port 61 of the apparatus body 60 may be connected with the material outlet 33 of the chamber 31, for example.

In addition, if it is necessary to heat the molding material, the injection apparatus 104 including the apparatus body 60, the material supply apparatus 70, the material guide apparatus 30, and the die 40 may be provided with a heating apparatus, such as a heater or a pipe that a heating medium flows through, at a necessary place. In addition, if it is necessary to cool off the molding material, the injection apparatus 104 including the apparatus body 60, the material supply apparatus 70, the material guide apparatus 30, and the die 40 may be provided with a cooling apparatus, such as a pipe that a cooling medium flows through, at a necessary place.

Since the material guide apparatus 30 and the die 40 are the same as the case of Embodiment 1 (see FIG. 1), the descriptions thereof will be omitted. FIG. 11, for example, illustrates the case where the material inlet 32 is provided on the top surface of the chamber 31. FIG. 11 illustrates the case where the cylinder 72 and the screw 73 are disposed so that the axial direction of the screw 73 is oriented in the left-right direction, for example.

The apparatus 60 includes the material supply port 61, the plasticizing cylinder 62, a plasticizing screw 63, a junction 64, a nozzle 65, an injection chamber 66, an injection cylinder 67, and an injection plunger 68. For the ease of description, the junction 64, the nozzle 65, and the injection cylinder 67 are shown in cross section. The plasticizing cylinder 62 and the injection cylinder 67 are connected by the junction 64. The inside of the plasticizing cylinder 62 and the inside of the injection cylinder 67 are in communication via a communication passage 64a formed in the junction 64.

The plasticizing cylinder 62 is formed with the material supply port 61 and accommodates the plasticizing screw 63 to be rotatable. The plasticizing screw 63 rotates to plasticize, melt, and supply the molding material guided from the material supply port 61 into the injection cylinder 67 via the communication passage 64a. The plasticizing screw 63 is rotated by a plasticizing screw driving apparatus not shown herein. The rotating plasticizing screw 63 delivers the molding material in a direction from the base of the plasticizing screw 63 toward the tip. Therefore, the apparatus body 10 is configured to be able to adjust the speed of supplying the molding material into the injection chamber 66 by the plasticizing screw driving apparatus that rotates the plasticizing screw 63.

The control apparatus 1 can, for example, control the rotation speed of the plasticizing screw 63 via the plasticizing screw driving apparatus, so that the speed at which the apparatus body 60 supplies the molding material into the injection chamber 66 is faster with respect to the speed at which the material supply apparatus 70 supplies the molding material to the material guide apparatus 30. The control apparatus 1 can, for example, control the rotation speed of the plasticizing screw 63 via the plasticizing screw driving apparatus, so as to adjust the speed at which the apparatus body 60 supplies the molding material into the injection chamber 66 in response to the amount of the molding material remaining in the material guide apparatus 30.

In the injection cylinder 67, the injection chamber 66 accommodating the molding material that is in a melt state and supplied via the plasticizing cylinder 62 and the communication passage 64a is formed, and the injection cylinder 67 accommodates the injection plunger 68 to be movable back and forth.

The injection chamber 66 is formed in front of the injection plunger 68, and the volume of the injection chamber 66 is increased/decreased by moving the injection plunger 68 back and forth.

The injection plunger 68 moves backward to measure the molding material in the melt state in the injection chamber 66, and moves forward to inject the molding material in the melt state in the injection chamber 66 into the mold m via the nozzle 15. "Moving forward" refers to the movement of the injection plunger 68 toward the direction of the mold m, and "moving backward" refers to the movement in the opposite direction. In addition, the injection plunger 68 is moved by an injection plunger driving apparatus not shown herein.

The communication passage 64a is opened at the time of measurement by a backflow prevention apparatus (not shown in FIG. 11), and is closed at the time of injection.

The backflow prevention apparatus, for example, moves the plasticizing screw 63 forward to close the opening of the communication path 64a on the side of the plasticizing cylinder 62 by using the tip of the plasticizing screw 63, and moves the plasticizing screw 63 backward to separate the tip of the plasticizing screw 63 from the opening of the communication path 64a on the side of the plasticizing cylinder 62, so as to open the opening on the side of the plasticizing cylinder 62. In addition, the backflow prevention apparatus may also be a valve mechanism, such as a rotary valve or a check valve, provided in the middle of the communication passage 64a. Regarding the junction 64 and the nozzle 65, details in this regard will be omitted.

The material supply apparatus 70 includes a material discharge port 71, a cylinder 72, a screw 73, and a hopper 74. For the ease of description, the cylinder 74 and the hopper 74 are shown in cross-sections.

The material discharge port 71 is a discharge port of a thermoplastic resin r, which is the molding material, accommodated in the cylinder 72, and the die 40 is attached to the material discharging port 71. The die 40 is removable. For example, if the material guide apparatus 30 is the chamber 31, the material discharge port 71 or the die 40 may be connected with the material inlet 32 of the chamber 31. As another example, if the material guide apparatus 30 is the chamber 31, the material discharge port 71 and the die 40 may protrude toward the inside of the chamber 31 from the material inlet 32.

The cylinder 72 accommodates the thermoplastic resin r, which is the molding material, and accommodates the screw 73 to be rotatable.

The screw 73 rotates to extrude the thermoplastic resin r, which is the molding material, in the cylinder 72 to the material guide apparatus 30 via the die 40. In addition, the screw 73 is moved by a screw driving apparatus not shown herein.

In addition, while the plasticization of the thermoplastic resin r may be performed by the screw 73, since the plasticizing screw 63 of the apparatus body 60 performs plasticization, complete plasticization is not necessary here.

In addition, the screw 73 is rotated by a screw driving apparatus not shown herein. The screw driving apparatus, like the pusher driving apparatus 231, is controlled by the control apparatus 1. Therefore, the material supply apparatus 70 is configured to be able to adjust the speed of supplying the molding material to the material guide apparatus 30 by the screw driving apparatus that rotates the screw 73. The control apparatus 1 can, for example, control the rotation speed of the screw 73 via the screw driving apparatus, so that the speed at which the material supply apparatus 70 supplies the molding material to the material guide apparatus 30 is slower with respect to the speed at which the apparatus body 60 supplies the molding material into the injection chamber 66. In addition, the control apparatus 1 can, for example, control the rotation speed of the screw 73 via the screw driving apparatus, so as to adjust the speed at which the material supply apparatus 70 supplies the molding material to the material guide apparatus 30 in response to the amount of the molding material remaining in the material guide apparatus 30.

5. Embodiment 5

Figure 12:
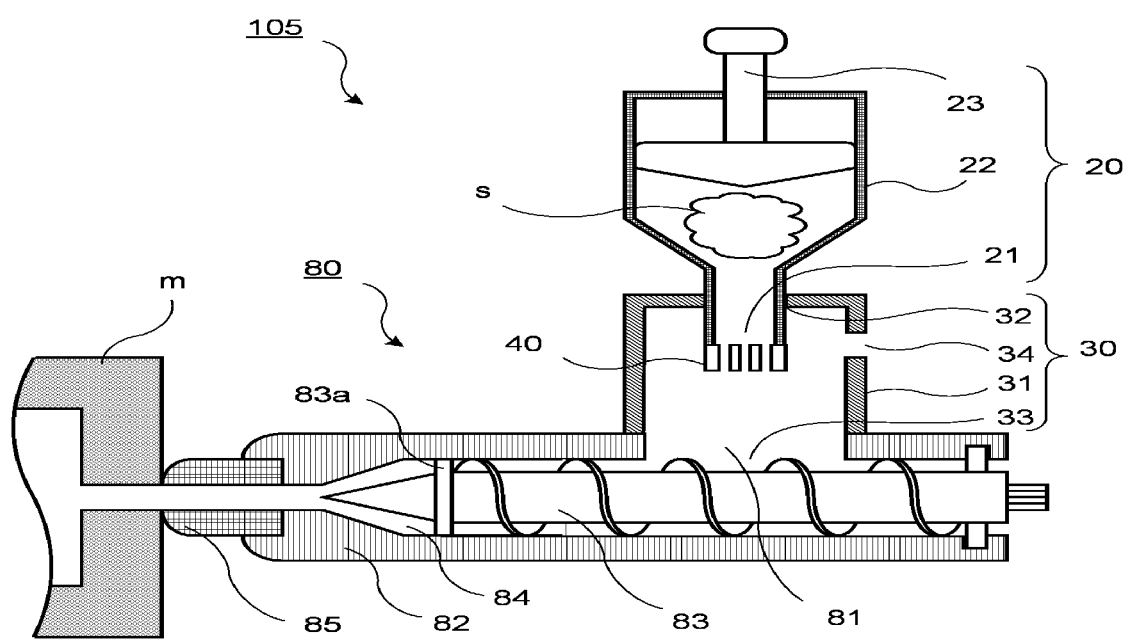
FIG. 12 is a view illustrating a configuration of an injection apparatus 105 according to an embodiment of the invention.

FIG. 12 is a view illustrating a configuration of an injection apparatus 105 according to an embodiment of the invention. As shown in FIG. 12, the injection apparatus 105 includes the material supply apparatus 20, the material guide apparatus 30, and the die 40, and injects the molding material supplied to the injection chamber 84 of the apparatus body 80 via the material supply port 81 formed in the apparatus body 80 to the mold m. If the material guide apparatus 30 is the chamber 30, the material supply port 81 of the apparatus body 80 may be connected with the material outlet 33 of the chamber 31, for example.

In addition, if it is necessary to heat the molding material, the injection apparatus 105 including the apparatus body 80, the material supply apparatus 20, the material guide apparatus 30, and the die 40 may be provided with a heating apparatus, such as a heater or a pipe that a heating medium flows through, at a necessary place. In addition, if it is necessary to cool off the molding material, the injection apparatus 105 including the apparatus body 80, the material supply apparatus 20, the material guide apparatus 30, and the die 40 may be provided with a cooling apparatus, such as a pipe that a cooling medium flows through, at a necessary place. Since the configurations of the material supply apparatus 20, the material guide apparatus 30, and the die 40 are the same as the case of Embodiment 1 (see FIG. 1), the descriptions thereof will be omitted.

The apparatus body 80 has the material supply port 81, an injection cylinder 82, an inline screw 83, an injection chamber 84, and a nozzle 85, and is therefore generally referred to as an inline injection apparatus.

The injection cylinder 82 is formed with the material supply port 81 and accommodates the inline screw 83 to be rotatable and movable back and forth.

The inline screw 83 is at least rotated by an inline screw driving apparatus not shown herein. The rotating inline screw 83 delivers the molding material guided from the material supply port 81 in a direction from the base of the inline screw 83 toward the tip. If the rotation speed of the inline screw 83 is increased, the speed of delivering the molding material guided from the material supply port 81 into the injection chamber 84 can be increased. Therefore, the apparatus body 80 is configured to be able to adjust the speed of supplying the molding material into the injection chamber 84 by the inline screw driving apparatus that rotates the inline screw 83.

The control apparatus 1 can, for example, control the rotation speed of the inline screw 83 via the inline screw driving apparatus, so that the speed at which the apparatus body 80 supplies the molding material into the injection chamber 84 is faster with respect to the speed at which the material supply apparatus 20 supplies the molding material to the material guide apparatus 30. The control apparatus 1 can, for example, control the rotation speed of the inline screw 83 via the inline screw driving apparatus, so as to adjust the speed at which the apparatus body 80 supplies the molding material into the injection chamber 84 in response to the amount of the molding material remaining in the material guide apparatus 30.

The inline screw driving apparatus may be configured by an inline screw rotation driving apparatus that at least rotates the inline screw 83. The inline screw driving apparatus, for example, may be configured by an inline screw rotation driving apparatus that rotates the inline screw 83 and an inline screw forward/backward driving apparatus that moves the inline screw 83. The inline screw forward/backward driving apparatus may also be disposed separately from the inline screw driving apparatus.

The molding material delivered by the rotating inline screw 83 is accommodated in the injection chamber 84 formed in the injection cylinder 82 and moves the inline screw 83 backward. The injection chamber 84 is formed in the injection cylinder 82 and in front of the inline screw 83, and the volume of the injection chamber 84 is increased/decreased by moving the inline screw 83 back and forth.

The nozzle 85 is attached to the tip of the injection cylinder 82. The inline screw 83 measures the molding material in the injection chamber by rotating while moving backward, and injects the molding material in the injection chamber 84 into the mold m via the nozzle 85 by stopping rotating and then moving forward. "Moving forward" refers to the movement of the inline screw 83 toward the direction of the mold m, and "moving backward" refers to the movement in the opposite direction. In addition, the inline screw 83 is moved by the inline screw driving apparatus or another driving apparatus not shown herein.

A check ring 83a is attached to the tip of the inline screw 83. The check ring 83a moves back and forth with respect to the inline screw 83. When the inline screw 83 rotates while moving backward, the check ring 83a moves forward to a predetermined position to allow the molding material to be accommodated in the injection chamber, and when the inline screw 83 stops rotating and then moves forward, the check ring 83a moves backward to a predetermined position and prevents the molding material in the injection chamber 84 from leaking behind the check ring 83a. Nevertheless, within a short period from the time when the inline screw 83 starts moving forward in the state in which the check ring 83a moves forward to the predetermined position until the check ring 83a moves backward to the predetermined position, there may be slight leakage behind the check ring 83a. Since the detailed operations of the injection apparatus 105 can be inferred from the descriptions above, the descriptions in this regard will be omitted.

6. Embodiment 6

Figure 13:
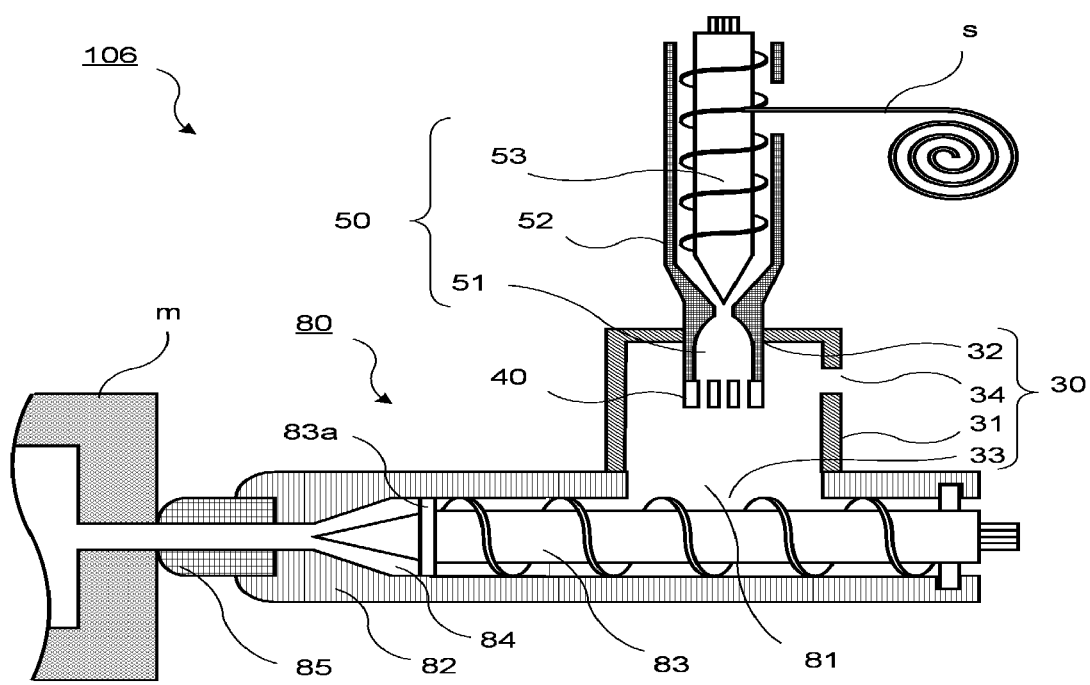
FIG. 13 is a view illustrating a configuration of an injection apparatus 106 according to an embodiment of the invention.

FIG. 13 is a view illustrating a configuration of an injection apparatus 106 according to an embodiment of the invention. As shown in FIG. 13, the injection apparatus 106 includes the material supply apparatus 50, the material guide apparatus 30, and the die 40, and injects the molding material supplied to the injection chamber 84 of the apparatus body 80 via the material supply port 81 formed in the apparatus body 80 to the mold m. Since the injection apparatus 106 is a combination of Embodiment 2 (see FIG. 9) and Embodiment 5 (see FIG. 12), detailed descriptions will be omitted.

7. Embodiment 7

Figure 14:
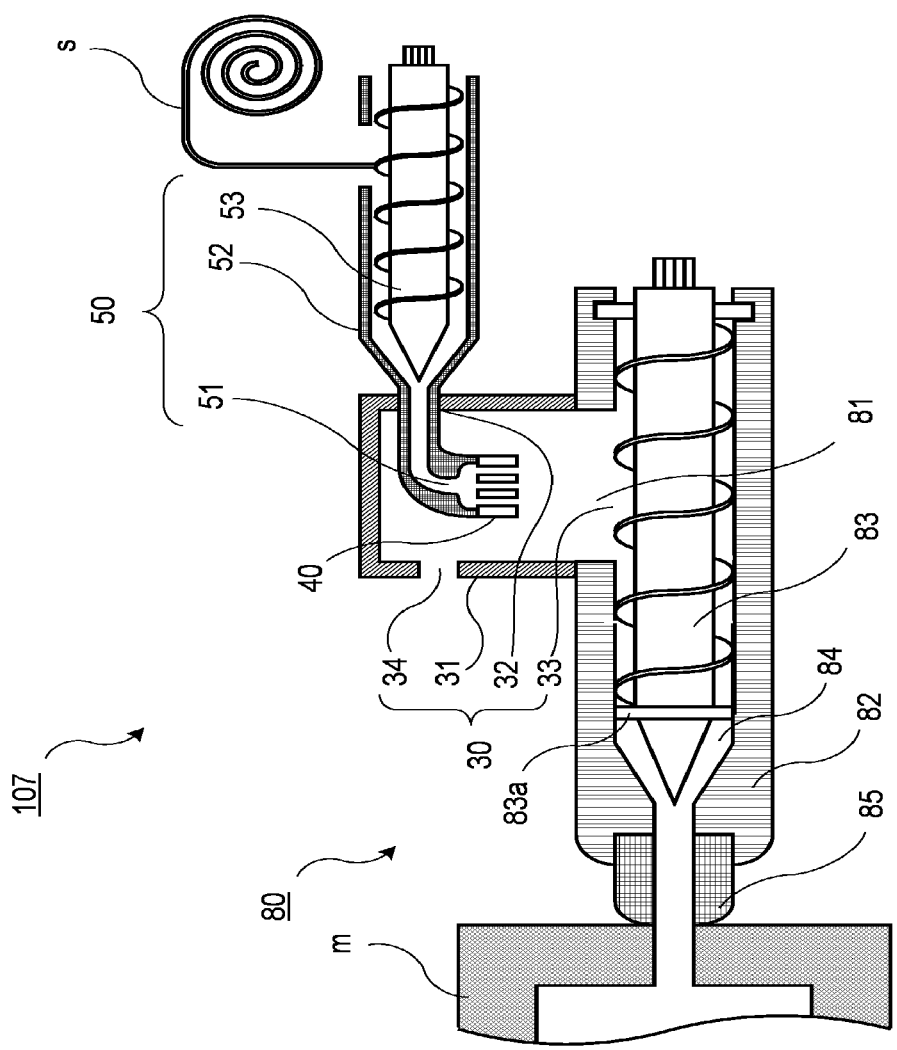
FIG. 14 is a view illustrating a configuration of an injection apparatus 107 according to an embodiment of the invention.

FIG. 14 is a view illustrating a configuration of an injection apparatus 107 according to an embodiment of the invention. As shown in FIG. 14, the injection apparatus 107 includes the material supply apparatus 50, the material guide apparatus 30, and the die 40, and injects the molding material supplied to the injection chamber 84 of the apparatus body 80 via the material supply port 81 formed in the apparatus body 80 to the mold m. Since the injection apparatus 107 is a combination of Embodiment 3 (see FIG. 10) and Embodiment 5 (see FIG. 12), detailed descriptions will be omitted.

8. Embodiment 8

Figure 15:
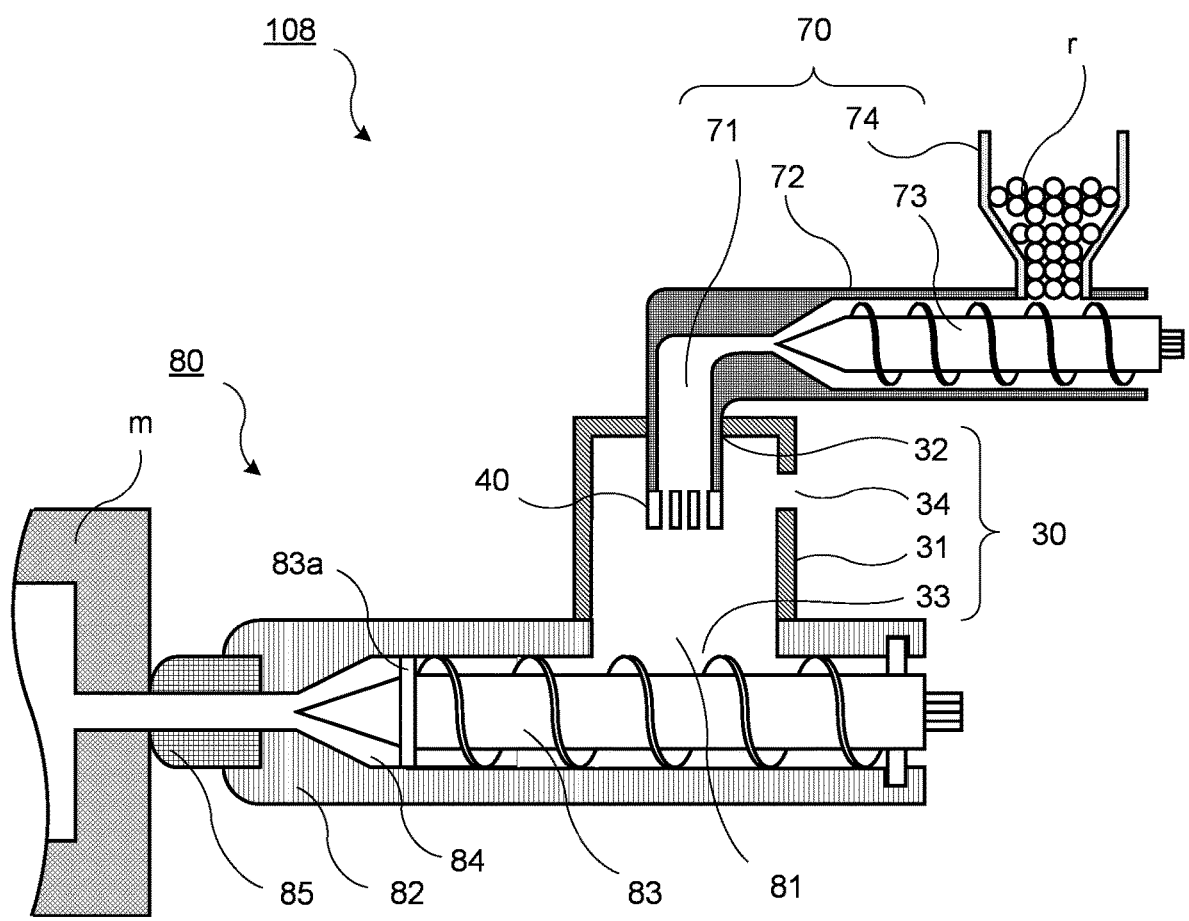
FIG. 15 is a view illustrating a configuration of an injection apparatus 108 according to an embodiment of the invention.

FIG. 15 is a view illustrating a configuration of an injection apparatus 108 according to an embodiment of the invention. As shown in FIG. 15, the injection apparatus 108 includes the material supply apparatus 70, the material guide apparatus 30, and the die 40, plasticizes and melts the molding material supplied into the injection chamber 84 of the apparatus body 80 via the material supply port 81 formed in the apparatus body 80 by the inline screw 83 that rotates and moves backward, and then injects the molding material in the melt state to the mold m by the inline screw 83 that moves forward. Since the injection apparatus 108 is a combination of Embodiment 4 (see FIG. 11) and Embodiment 5 (see FIG. 12), detailed descriptions will be omitted.

According to an aspect of the invention, gas, such as air, can be removed from the molding material into which gas, such as air, is mixed. According to an aspect of the invention, the yield of the molded article can be increased. According to an aspect of the invention, the quality of the molded article can be facilitated.

The embodiment was chosen in order to explain the principles of the invention and its practical application.

Many modifications and variations are possible in light of the above teachings. It is intended that the scope of the invention be defined by the claims.

What is claimed is:

1. An injection apparatus, injecting a molding material supplied into an injection chamber of an apparatus body via a material supply port formed in the apparatus body, the injection apparatus comprising a die, a material supply apparatus, and a material guide apparatus,
    wherein the die is provided between the material supply apparatus and the material guide apparatus, and has at least one through hole that penetrates through from the material supply apparatus to the material guide apparatus,
    the material supply apparatus is configured to be able to supply the molding material that is thread-like or strip-like and has a cross section shape matching a shape of the through hole of the die to the material guide apparatus via the die by a pusher or a screw that extrudes the molding material,
    the material guide apparatus is a chamber, and is configured to be able to guide the molding material supplied via the die to the material supply port,
    a material discharge port of the material supply apparatus is further provided to protrude downward along a gravity direction inside the chamber of the material guide apparatus, and the die is attached to an end part of the material discharging port so that the whole die is disposed inside the chamber, and
    a pressure reducing port is provided above the die and the material discharge port where the die is disposed in the chamber, and a pressure inside the chamber is reduced from the pressure reducing port by a pressure reducing apparatus.

2. The injection apparatus as claimed in claim 1, wherein the material supply apparatus is configured to be able to adjust a speed of supplying the molding material to the material guide apparatus by a pusher driving apparatus that drives the pusher or a screw driving apparatus that drives the screw, and
    the injection apparatus comprises a control apparatus that controls the pusher driving apparatus or the screw driving apparatus, so that a speed at which the material supply apparatus supplies the molding material to the material guide apparatus is slower than a speed at which the apparatus body supplies the molding material to the injection chamber.

3. The injection apparatus as claimed in claim 1, wherein the material supply apparatus is configured to be able to adjust a speed of supplying the molding material to the material guide apparatus by a pusher driving apparatus that drives the pusher or a screw driving apparatus that drives the screw, and
    the injection apparatus comprises a control apparatus that controls the pusher driving apparatus or the screw driving apparatus, so as to adjust a speed at which the material supply apparatus supplies the molding material to the material guide apparatus in response to an amount of the molding material remaining in the material guide apparatus.

4. The injection apparatus as claimed in claim 1, wherein the apparatus body has a supply screw, a plasticizing screw, or an inline screw that supplies the molding material into the injection chamber, and is configured to be able to adjust a speed of supplying the molding material into the injection chamber by a supply screw driving apparatus that drives the supply screw, a plasticizing screw driving apparatus that drives the plasticizing screw, or an inline screw driving apparatus that drives the inline screw, and the injection apparatus comprises a control apparatus that controls the supply screw driving apparatus, the plasticizing screw driving apparatus, or the inline screw driving apparatus, so that the speed at which the apparatus body supplies the molding material into the injection chamber is faster than a speed at which the material supply apparatus supplies the molding material to the material guide apparatus.

5. The injection apparatus as claimed in claim 1, wherein the apparatus body has a supply screw, a plasticizing screw, or an inline screw that supplies the molding material into the injection chamber, and is configured to be able to adjust a speed of supplying the molding material into the injection chamber by a supply screw driving apparatus that drives the supply screw, a plasticizing screw driving apparatus that drives the plasticizing screw, or an inline screw driving apparatus that drives the inline screw, and the injection apparatus comprises a control apparatus that controls the supply screw driving apparatus, the plasticizing screw driving apparatus, or the inline screw driving apparatus, so as to adjust the speed at which the apparatus body supplies the molding material into the injection chamber in response to an amount of the molding material remaining in the material guide apparatus.

6. The injection apparatus as claimed in claim 1, wherein the die is configured to be removable.

7. The injection apparatus as claimed in claim 1, wherein the die is configured to be able to adjust a size of the through hole.

8. The injection apparatus as claimed in claim 1, wherein the material supply apparatus comprises a cylinder that accommodates the molding material and accommodates the pusher to be movable back and forth, and the pusher moves forward to extrude the molding material in the cylinder to the material guide apparatus via the die.

9. The injection apparatus as claimed in claim 1, wherein the material supply apparatus comprises a cylinder that accommodates the molding material and accommodates the screw to be rotatable, and the screw rotates to extrude the molding material in the cylinder to the material guide apparatus via the die.

10. The injection apparatus as claimed in claim 1, wherein the molding material is rubber or silicon rubber, the apparatus body comprises a supply cylinder, a supply screw, an injection cylinder, and an injection plunger, the supply cylinder is formed with the material supply port, and accommodates the supply screw to be rotatable, the supply screw rotates to supply the molding material guided from the material supply port into the injection cylinder, the injection cylinder is formed with the injection chamber that accommodates the molding material supplied from the supply cylinder, and accommodates the injection plunger to be movable back and forth, and the injection plunger moves backward to measure the molding material in the injection chamber, and moves forward to inject the molding material in the injection chamber.

11. The injection apparatus as claimed in claim 1, wherein the molding material is thermoplastic resin, the apparatus body comprises a plasticizing cylinder, a plasticizing screw, an injection cylinder, and an injection plunger, the plasticizing cylinder is formed with the material supply port, and accommodates the plasticizing screw to be rotatable, the plasticizing screw rotates to plasticize, melt, and supply the molding material guided from the material supply port into the injection cylinder, the injection cylinder is formed with the injection chamber that accommodates the molding material in a melt state supplied from the plasticizing cylinder, and accommodates the injection plunger to be movable back and forth, and the injection plunger moves backward to measure the molding material in the melt state in the injection chamber, and moves forward to inject the molding material in the melt state in the injection chamber.

\* \* \* \* \*